United States Patent
Wehner

Patent Number: 6,142,423
Date of Patent: Nov. 7, 2000

[54] EPHEMERIS/ATTITUDE REFERENCE DETERMINATION USING ON-BOARD OPTICS AND OTHER SATELLITE EPHEMERIS

[75] Inventor: James W. Wehner, Torrance, Calif.

[73] Assignee: TRW Inc., Redondo Beach, Calif.

[21] Appl. No.: 09/342,715

[22] Filed: Jun. 29, 1999

[51] Int. Cl.[7] ........................................ B64G 1/24
[52] U.S. Cl. .................... 244/164; 244/171; 244/158 R
[58] Field of Search .................. 244/158 R, 164, 244/171, 161; 701/13

[56] References Cited

U.S. PATENT DOCUMENTS

| | | | |
|---|---|---|---|
| 5,372,340 | 12/1994 | Ihara et al. | 244/158 R |
| 5,546,309 | 8/1996 | Johnson et al. | 244/164 |
| 5,935,196 | 8/1999 | Brodie et al. | 244/158 R |
| 6,038,499 | 3/2000 | Kandu | 244/158 R |

Primary Examiner—J. Woodrow Eldred
Attorney, Agent, or Firm—Michael S. Yatsko

[57] ABSTRACT

The present invention provides a system (200) for determining the ephemeris and attitude for a spacecraft based on optical payload pointing directions and the ephemeris of other spacecraft. An ephemeris determining subsystem (300) obtains ephemeris data (308) for one or more reference spacecraft. Optical payload pointing information (306) is obtained for the optical payload pointed to the reference spacecraft. The spacecraft ephemeris (312) is then calculated with ephemeris determination algorithms (302) based on the ephemeris data (308) and optical payload pointing information (306). Other available information, such as stored results of previous measurements and calculations, time (310), spacecraft attitude (304), information from non-payload sensors and ranging information may be used to enhance the accuracy or decrease the complexity of the ephemeris calculations. Spacecraft attitude can also be determined using reference spacecraft ephemeris data and optical payload pointing information.

28 Claims, 7 Drawing Sheets

EPHEMERIS/ATTITUDE REFERENCE DETERMINATION USING ON-BOARD OPTICS AND OTHER SATELLITE EPHEMERIS

CROSS-REFERENCE TO RELATED APPLICATIONS

This application is related to TRW Docket No. 11-1000 titled "Ephemeris/Attitude Reference Determination Using Communications Links", filed herewith, and TRW Docket No. 11-0998 titled "Ephemeris Determination Using Intersatellite Ranging and Ephemeris Knowledge of Other Satellites", filed herewith.

BACKGROUND OF THE INVENTION

The present invention generally relates to satellite ephemeris and attitude determination. More specifically, the present invention relates to utilizing on-board optics pointing information and knowledge of the ephemeris and attitude of other satellites to determine satellite ephemeris and attitude.

Attitude and orbit determination and control are important aspects of most satellite systems. The satellite Attitude Determination and Control Subsystem (hereinafter "ADCS") measures and maintains the spacecraft's attitude (or orientation about its center of mass). The ADCS stabilizes the vehicle and orients it in desired directions during the mission despite the external disturbance torques acting on it. This first requires the spacecraft to determine its attitude using sensors. External references must be used to determine the absolute attitude of the spacecraft. The external references may include the Sun, the Earth's infrared horizon, magnetic fields, and the stars. To maintain attitude reference between calculations based on external references, the satellite may carry inertial sensors such as gyroscopes. Next, the ADCS must control the spacecraft's attitude using actuators, such as reaction wheels, control-moment gyros, magnetic torquers, and gas jets or thrusters.

Similarly, the guidance and navigation function, also known as the Orbit Determination and Control Subsystem (hereinafter "ODCS"), measures and controls the position of the spacecraft's center of mass. The position (and optionally the velocity) of a spacecraft as a function of time is commonly referred to as the satellite ephemeris. The on-board ODCS determines the spacecraft's position in space using sensors. External references must be used to determine the absolute position of the spacecraft. The external references may include the Sun, the Earth's infrared horizon, magnetic fields, and the stars. Next, the ODCS must control the orbital position of the spacecraft using actuators, such as gas jets or thrusters. Orbital control is required whenever a satellite is trying to maintain or achieve a desired orbit. Orbital control is needed to overcome orbit perturbations to achieve position maintenance in orbits including, but not limited to, Low-Earth Orbit (hereinafter "LEO") and Geosynchronous Earth Orbit (hereinafter "GEO") stationkeeping. Maintaining relative satellite positions, such as in constellation maintenance, also requires orbital control.

Navigation provides the information necessary to determine a satellite's ephemeris, just as attitude determination provides the information necessary for attitude control. Guidance refers to the process of adjusting a satellite's position in space. Thus, a requirement for orbit control will ordinarily result in a corresponding requirement for guidance and navigation. In addition, ephemeris information may be used in processing data from the payload. Irrespective of orbit control, there is often a need to point an antenna or instrument in some direction to perform communication or observation tasks. For example, in satellite systems designed to track objects, knowledge of the positions of the satellites sensing the objects being tracked may be critical. Since the position of an object being tracked is ultimately derived from the position in space of the satellite(s) sensing the object, the accuracy of the tracking is directly dependent upon the accuracy with which the position of the satellite(s) is known.

Forces continually act on the satellite to move it away from the nominal attitude and orbit. There are short-term orbital variations (also known as "perturbations") that are periodic with a period less than or equal to the orbital period, and there are long-period perturbations, which are orbital variations with a period greater than the orbital period. There are also secular variations, which represent a linear orbital variation that increases over time. The primary forces that perturb a satellite orbit arise from third bodies such as the Sun and the Moon, the non-spherical mass distribution of the Earth, atmospheric drag, and solar radiation pressure. One of the principal non-gravitational force acting on satellites in LEO is atmospheric drag. Drag acts in the opposite direction of the velocity vector and removes energy from the satellite in orbit. This reduction of energy causes the orbit to decay, leading to further increases in drag, and eventually, re-entry.

In the past, guidance and navigation have involved intense ground-operation activity. However, on-board computers have become computationally powerful, lightweight, and energy efficient. Satellites now carry advanced on-board computers and are capable of performing autonomous guidance and navigation. Another important factor enabling a move to autonomous navigation is the development of accurate on-board sensors, such as Navistar. The principal problem remaining is that of providing the on-board computers with ephemeris and attitude data from a source that is reliable, robust, and economical in terms of both cost and weight.

Many autonomous navigation methods currently exist. For example, the Microcosm Autonomous Navigation System uses observations of the Earth, Sun, and Moon, and determines orbit, attitude, ground look point, and Sun direction. Its typically accuracy is approximately 100 m–400 m in a LEO system. Another navigational aid is the Space Sextant, which uses the angle between particular stars and the Moon's limb. The space sextant determines both orbit and attitude, and its typical accuracy is 250 m. Stellar refraction is another navigation system and uses the refraction of starlight passing through the atmosphere to determine both orbit and attitude. Its typical accuracy is 150 m–100 m. Yet another system is Landmark Tracking, which makes use of angular measurements of landmarks to determine both orbit and attitude. Its typical accuracy is measured in kilometers.

The most popular navigational system is Navstar, also known as the Global Positioning System (hereinafter "GPS"), which uses a network of navigation satellites. GPS is currently operational and can provide spacecraft ephemeris information for orbit determination via on-board GPS receivers and GPS receive antennas. Attitude determination using GPS and multiple GPS antennas has also been demonstrated. The positional accuracy obtainable from GPS is in the 15 m to 100 m range depending on whether the system is using military or commercial grade data. GPS receivers receive signals from multiple GPS satellites and use the received information to solve simultaneously for the three components of the observer's position and the current time.

This information is continually updated, providing position and velocity information, which is in turn used to determine orbital parameters. The GPS constellation is at approximately half-geosynchronous altitude and works best for LEO satellites. Since GPS is operationally proven and at least as accurate as other known navigational systems, it is commonly used.

However, two significant problems with GPS are reliability and cost. The potential lack of availability of the GPS satellites for even a short period due to either geometrical circumstances, the failure of one of more of the GPS satellites, or the failure of the on-board GPS receiver is a major concern for an expensive spacecraft which depends on GPS for attitude and positional determination. In addition, space grade GPS receivers can be prohibitively expensive, particularly since critical satellite systems in need of accurate positional data may employ redundant GPS receivers on-board each satellite. The additional expense of a redundant GPS receiver, particularly to each satellite in a satellite constellation system potentially comprising dozens of satellites with limited lifespans, is substantial. One motivation for the current invention is to provide a method and apparatus which would effectively serve as a backup to an expensive primary navigational system such as GPS.

A need has long existed for an improved satellite attitude and ephemeris determination system.

SUMMARY OF THE INVENTION

It is an object of the present invention to provide an ephemeris and attitude determination system which utilizes existing satellite subsystems.

It is another object of the present invention to provide an ephemeris and attitude determination system which utilizes existing satellite payload subsystems.

It is another object of the present invention to provide an ephemeris and attitude determination system which utilizes existing satellite payload subsystems and inherent characteristics of satellite communication networks.

It is a further object of the present invention to provide an attitude and ephemeris determination system which determines the attitude and ephemeris for a spacecraft based on the ephemeris of reference spacecraft.

It is yet another object of the present invention to provide an attitude and ephemeris determination system which determines the attitude and ephemeris for a spacecraft based on the ephemeris of reference spacecraft and pointing information for payload optics.

One or more of the foregoing objects is met in whole or in part by a preferred embodiment of the present invention that provides a method and apparatus for the determination of the attitude and ephemeris of a spacecraft. For ephemeris determination, reference ephemeris information for reference spacecraft is obtained. The reference ephemeris information is preferably received directly from crosslinked reference spacecraft. For example optical payload sensors may be pointed at a reference spacecraft, with resolvers (attached to optical payload steering motors) providing the sensor pointing information. Attitude reference for the spacecraft may be obtained from the spacecraft's attitude determination subsystem, and an on-board clock supplies time information. Ephemeris determination algorithms then calculate the spacecraft's ephemeris based on the reference ephemeris information, optical payload sensor pointing information, attitude reference and time information. The Ephemeris determination algorithms preferably employ Kalman filtering and associated ephemeris propagation.

Similarly, for attitude determination, reference ephemeris information for reference spacecraft is obtained. The reference ephemeris information is preferably received from crosslinked reference spacecraft. Payload optical sensor pointing information is obtained from resolvers attached to payload optics assembly steering motors, and an on-board clock supplies time information. Attitude determination algorithms then calculate the spacecraft's attitude based on the reference ephemeris information, payload optical sensor pointing information and time information. As with ephemeris, the attitude determination algorithms preferably employ Kalman filtering and attitude propagation.

DETAILED DESCRIPTION OF THE PREFERRED EMBODIMENT

Figure 1:
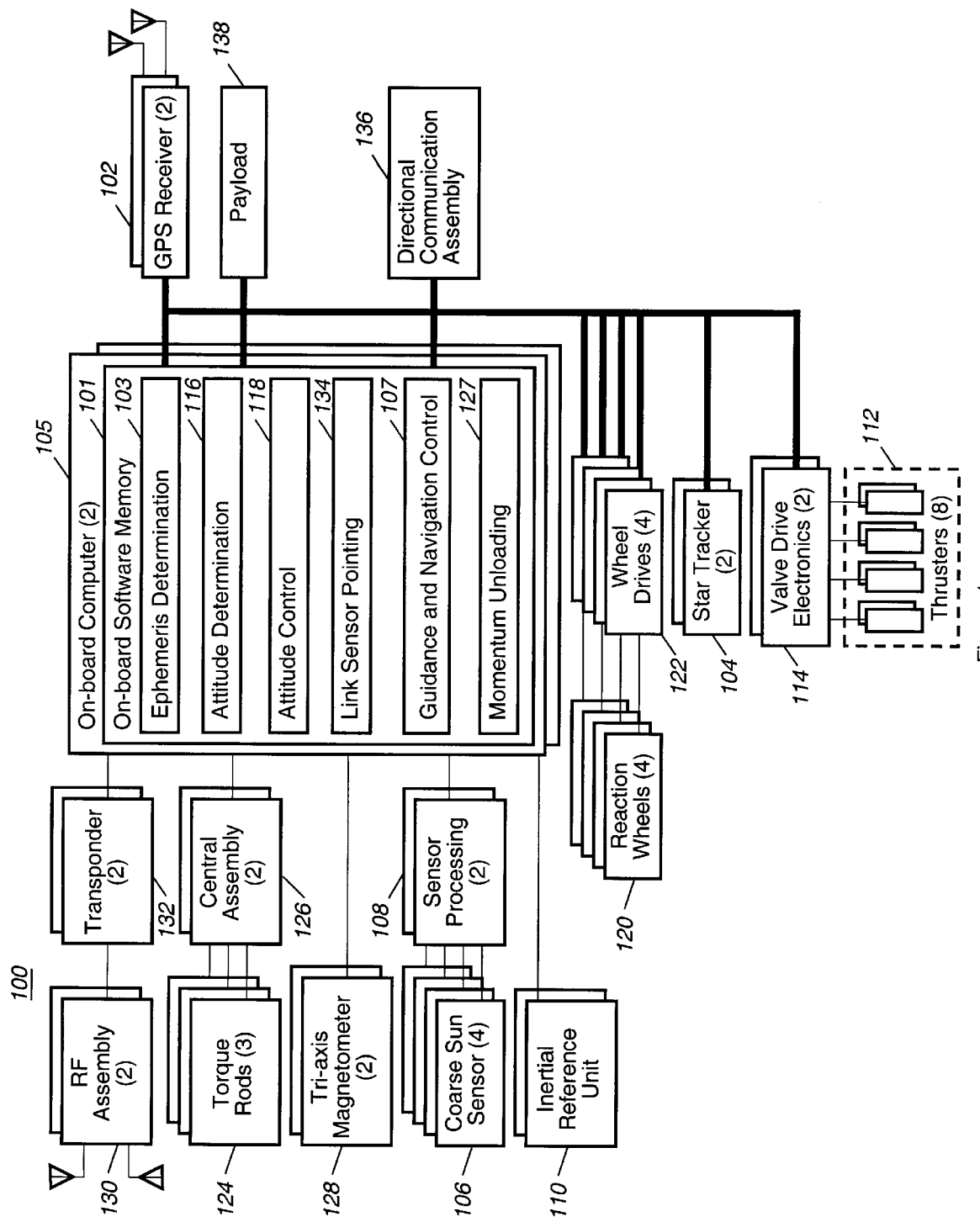
FIG. 1 illustrates a typical on-board satellite system with redundant GPS receivers.

FIG. 1 illustrates a block diagram of a typical on-board satellite system 100. The satellite system 100 includes ephemeris determination components which determine the orbital position for the satellite system 100 as a function of time. The satellite system 100 acquires its ephemeris information from a pair of GPS receivers 102, one of which is redundant. One of the motivations underlying the present invention is to reduce the prohibitive cost associated with space grade GPS receivers. The elimination of one or both of the GPS receivers 102 from the satellite system 100 results in a substantial cost savings.

On-board ephemeris determination software 103 resides in a memory 101 coupled to the on-board computer (or processor) 105 and is provided to monitor the ephemeris and propagate the ephemeris between GPS readings. Once the ephemeris has been determined, it is sent to the guidance and navigation control software 107, which compares the determined ephemeris to the desired ephemeris. If necessary, adjustments to the orbit are made using the thrusters 112 and their control circuitry 114.

The satellite system 100 also includes attitude reference determination components, which determine the attitude of the spacecraft. The satellite system 100 illustrated in FIG. 1 may, for example, include a star tracker 104 for attitude determination. Coarse sun sensors 106 and accompanying circuitry 108 may also be included for coarse attitude reference determination and are typically used when spacecraft anomalies occur and precision attitude reference using the star tracker 104 is not functioning properly.

In order to propagate attitude between sensor readings, or when access to the stars is not available, an inertial reference unit 110 is included. Information from the inertial reference unit 110 and star tracker 104 are used by the on-board attitude determination software 116. The attitude determination software 116 determines and tracks attitude, propagates attitude between sensor readings, and provides attitude information to the attitude control software 118. In turn, the attitude control software 118 sends signals to the attitude control hardware which executes the desired attitude adjustments. The attitude control hardware for the satellite system 100 illustrated in FIG. 1 includes reaction wheels 120 and their associated drives 122. Accelerating and decelerating the reaction wheels 120 induces torques on the satellite body due to conservation of angular momentum. The induced torques, in turn, cause the satellite body to rotate in the desired directions.

During its lifetime, the satellite is exposed to attitude perturbing torques. The torques may be due to solar pressure, atmospheric drag, gravity gradient, the Earth's magnetic field, and other causes. As noted above, the attitude control system compensates for these torques using the reaction wheels 120. However, if the torques do not average out over time, the angular velocity of the reaction wheels 120 will continually increase. Eventually, the angular velocity of the reaction wheels 120 may exceed some maximum limit. Momentum unloading components are typically provided to address this concern.

For example, the satellite system 100 may include torque rods 124 and their respective controllers 126 which act in conjunction with the Earth's magnetic field to impart torques on the spacecraft. A magnetometer 128 is used to sense the Earth's magnetic field. Momentum unloading software 127 then controls currents in the torque rods to generate compensating torques, which in turn result in the attitude control system slowing down the reaction wheels 120.

An omni-directional RF assembly 130 and a transponder 132 are provided to enable communication with the spacecraft regardless of the satellite attitude or sensor orientations. A directional communication assembly 136 containing directional link sensors is preferably provided for maintaining crosslinks to other spacecraft and/or uplinks and downlinks to earth stations. The directional link pointing software 134 controls the pointing of the directional link sensors in the directional communication assembly 136.

Figure 2:
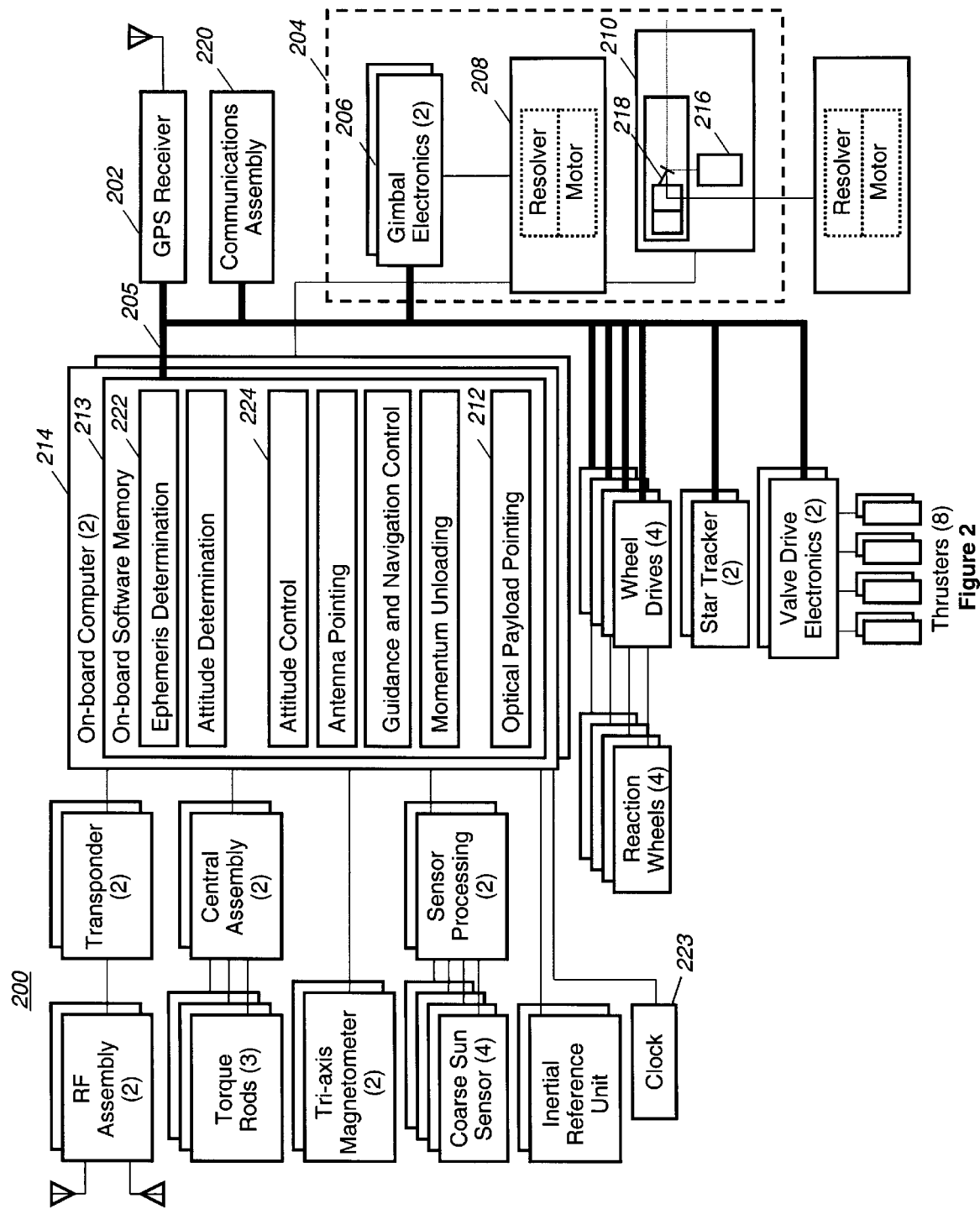
FIG. 2 illustrates a satellite system incorporating an ephemeris determination subsystem according to a preferred embodiment of the present invention.

FIG. 2 illustrates a satellite communication system 200 incorporating an ephemeris determination subsystem according to a preferred embodiment of the present invention. A single GPS receiver 202, rather than a redundant pair, is utilized for primary ephemeris determination. The backup ephemeris determination subsystem utilizes knowledge of the ephemeris of other spacecraft and optical payload pointing information to determine the ephemeris of the satellite. A GPS failure would effectively render useless the GPS receiver 202. Therefore, another mechanism for determining satellite ephemeris utilizing the remaining functional components on-board the satellite is required. Optionally, information from the GPS receiver 202 could be used to augment ephemeris determinations made by an ephemeris determination system according to the present invention.

The optical payload pointing control software 212 resides in memory 213 coupled to a computer (or processor) 214. An optical payload assembly 204 is coupled to the computer 214 by a data bus 205. The optical payload assembly 204 includes gimbal drive electronics 206, a gimbal assembly 208, and an optical sensor assembly 210. The computer 214 sends pointing commands to the gimbal drive electronics 206, which in turn, drive the gimbal assembly 208, which is attached to the optical sensor assembly 210. The gimbal assembly 208 measures the coarse optical sensor assembly 210 pointing direction and provides optical payload pointing data to the computer 214. The optical sensor assembly 210 contains an optical sensor 216 and preferably a fast-steering mirror assembly 218 for obtaining accurate optical payload pointing data. Fast steering mirror assembly includes resolvers and motors for monitoring and control of the fine pointing of the optical sensor, particularly to remove induced jitter. The optical payload pointing control software 212 sends commands to the gimbal drive electronics 206 to point the optical sensor assembly 210 to the reference spacecraft. Note that the optical sensor 216 may detect both visible and non-visible portions (e.g., infrared and ultraviolet) of the light spectrum.

A communications assembly 220 is provided to receive ephemeris information for the reference spacecraft. The communications assembly 220 preferably comprises a receiver which receives reference spacecraft ephemeris information from other spacecraft via crosslinks or from earth stations via uplinks. The receiver demodulates and decodes the received ephemeris information and provides reference spacecraft ephemeris data to the computer 214 via the data bus 205.

The ephemeris determination software 222 resides in memory 213 coupled to the computer 214. The computer 214 receives optical payload pointing data from the optical payload assembly 204 and reference spacecraft ephemeris data from the communications assembly 220. Ephemeris determination instructions in the ephemeris determination software 222 determine the satellite ephemeris by acting on the optical payload pointing data and the reference spacecraft ephemeris data. The ephemeris determination software 222 may, for example, determine the ephemeris of the satellite using established trigonometric identities.

In the preferred embodiment, an attitude reference subsystem, including the attitude control software 224, provides satellite attitude reference data to the ephemeris determination software 222, which in turn incorporates the attitude reference data into the ephemeris determination.

The ephemeris determination software 222 may determine ephemeris by considering reference spacecraft ephemeris and optical payload pointing data at multiple points in time. A system clock 223 is therefore provided which sends time data to the computer 214. The time data may then be incorporated into the ephemeris determination.

The ephemeris determination system for a space vehicle according to a preferred embodiment of the present invention need not be the only functioning ephemeris determination system for the space vehicle. Ephemeris information for the space vehicle may be received from an external entity, such as a ground station, or from an independent ephemeris reference subsystem on-board the space vehicle. Such independent ephemeris reference subsystems may reside on the space vehicle but act independently from the preferred embodiment and may include, for example, an on-board GPS-based system. The ephemeris reference information for the space vehicle may then be used by the ephemeris determination software 222 for comparison to or averaging with its own ephemeris determination.

Additionally, it should be understood that although the components according to the preferred embodiment illustrated in FIG. 2 reside entirely on-board a spacecraft, particular components may alternatively reside at a ground station with communications links serving as couplings between the spacecraft components and the terrestrial components. For example, the memory 213 and computer 214 may reside at a ground station which is communicationally coupled to the rest of the satellite system 200.

Figure 3:
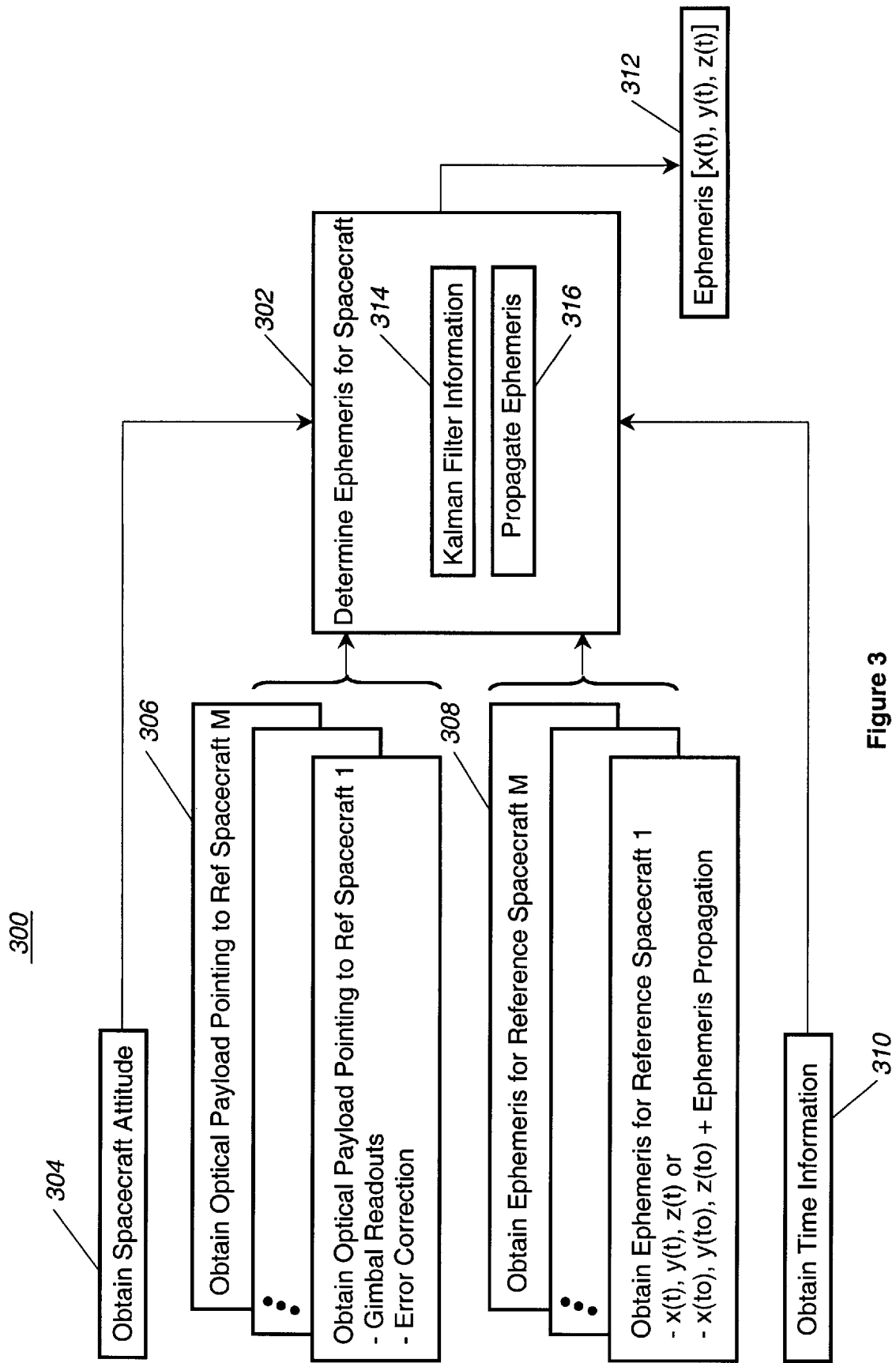
FIG. 3 illustrates ephemeris determination according to a preferred embodiment of the present invention.

FIG. 3 illustrates an ephemeris determination process 300 according to a preferred embodiment of the present invention. The attitude for the spacecraft is obtained 304 and provided for ephemeris determination 302. Pointing direction information 306 for the optical payload sensors (pointed to at least one reference spacecraft) is also obtained and provided for ephemeris determination 302. In addition, ephemeris information for each reference spacecraft is obtained at step 308 and provided for ephemeris determination 302. Finally, time 310 is obtained and provided for ephemeris determination 302. The ephemeris determination step 302 then determines the ephemeris for the spacecraft based on the input information obtained and provided in steps 304, 306, 308 and 310.

The ephemeris determination step 302 preferably includes a Kalman filtering step 314 so that past information and determinations can be used to increase the fidelity of the current ephemeris determination. In addition, the ephemeris determination step 302 preferably contains an ephemeris propagating step 316, including gravitational modeling, for the propagation of ephemeris between external inputs and optionally for the propagation of the ephemeris of the reference spacecraft. The result of the ephemeris determination step 302 includes the determined ephemeris 312 for the spacecraft.

Figure 4:
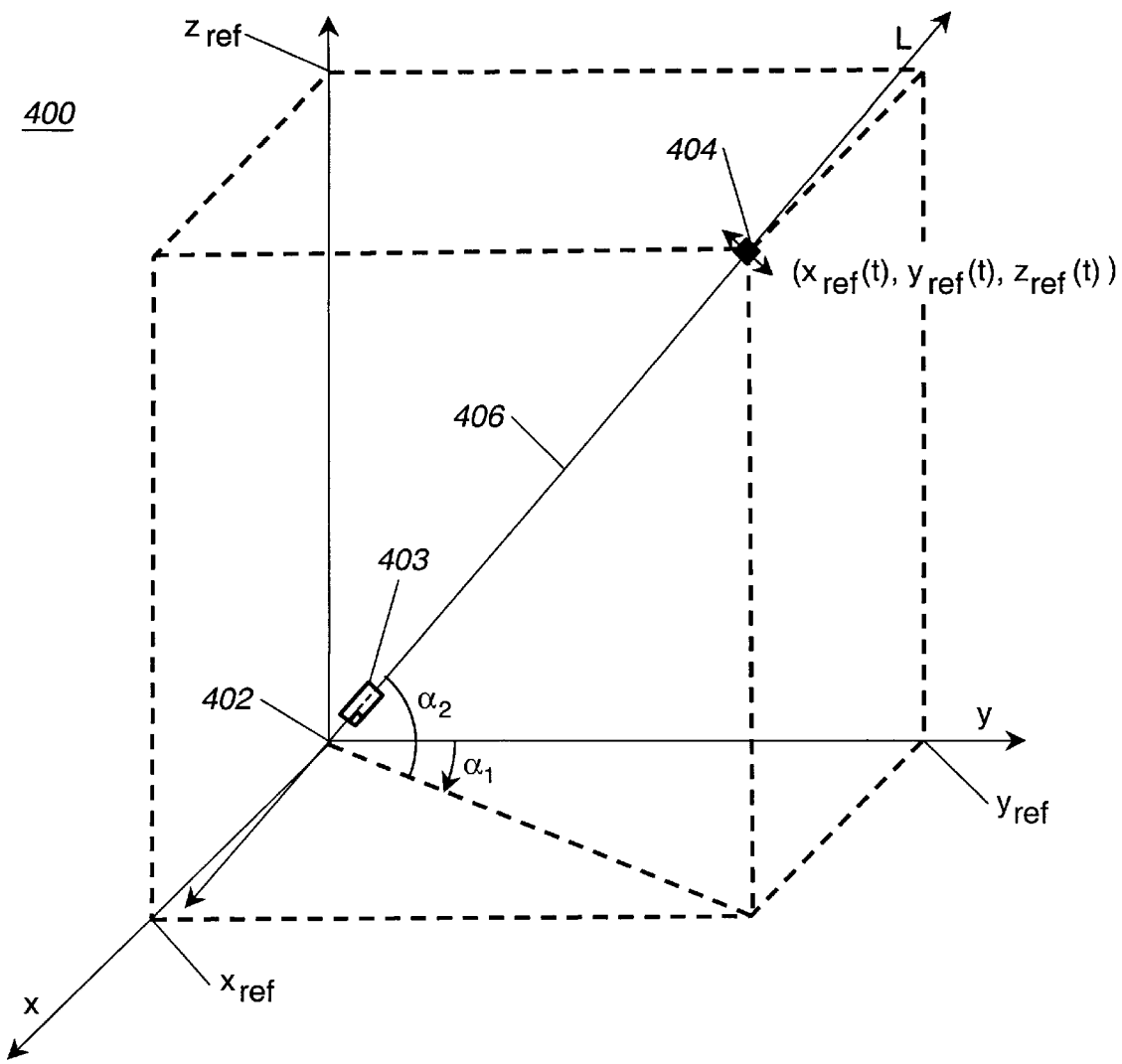
FIG. 4 shows a three-dimensional space diagram illustrating the concept of optical payload pointing direction.

Turning to FIG. 4, that figure shows a diagram illustrating the concept of optical payload pointing direction. A three-dimensional space 400 is illustrated including a satellite 402 at the origin. Even though the satellite 402 may no longer be receiving GPS information, the satellite 402 is able to propagate its ephemeris using orbital models. Thus, for a period of time, the satellite 402 is able to propagate its own ephemeris with a reasonable degree of accuracy. In addition, through ephemeris propagation techniques, the satellite 402 knows approximately where other spacecraft (e.g., the reference spacecraft 404) that it should be able to view are located. The satellite 402 points its optical payload 403 toward the reference spacecraft 404. An optical payload pointing controller on-board the satellite 402 then fine tunes the pointing direction, possibly by centering the reference spacecraft 404 in the field of view of the optical payload 403. The optical payload 403 pointing angles, α1 and α2, are used as an indication of the direction of the reference spacecraft 404. In addition to the sensor pointing angles, α1 and α2, the satellite 402 also obtains the ephemeris ($x_{ref}(t)$, $y_{ref}(t)$ and $z_{ref}(t)$) of the reference spacecraft 404. This ephemeris information may either be received from the reference spacecraft 404 via a crosslink or from a ground station via an uplink.

The distance 406 from the satellite 402 to the reference spacecraft 404 is generally unknown. However a line pointing from the satellite 402 to the reference spacecraft 404 may be defined by the ephemeris ($x_{ref}(t)$, $y_{ref}(t)$ and $z_{ref}(t)$) of the reference spacecraft 404 and the two sensor pointing angles, α1 and α2.

In ephemeris determination, a spacecraft determines its coordinates in three-dimensional space using a particular coordinate system. For the preferred embodiment, as illustrated in FIG. 2, the satellite system 200 has an independent and functional attitude reference and control system. Thus the satellite system 200 knows its orientation in space, and only needs to determine its location.

To solve for the satellite coordinates, three independent equations involving only the three unknowns may be used. In FIG. 4, the sensor pointing angles (α1 and α2) were determined along with the ephemeris ($x_{ref}(t)$, $y_{ref}(t)$ and $x_{ref}(t)$) of the reference spacecraft 404. This information, combined with the satellite's knowledge of its own attitude is enough information to determine a line in three-dimensional space containing the satellite 402 and the reference spacecraft 404. Additional information will be used to determine the spacecraft's exact position on that line.

One option is to measure the optical payload pointing angles to the reference spacecraft 404 at another point in time. Because the satellite 402 knows the expected orbit of the reference spacecraft 404, and for this example, also knows that the expected orbit has substantial components nonparallel to the orbit of the spacecraft 402, a second optical payload pointing angle measurement provides adequate information to solve for the spacecraft 402 coordinates. This option is further illustrated in FIG. 5.

Figure 5A:
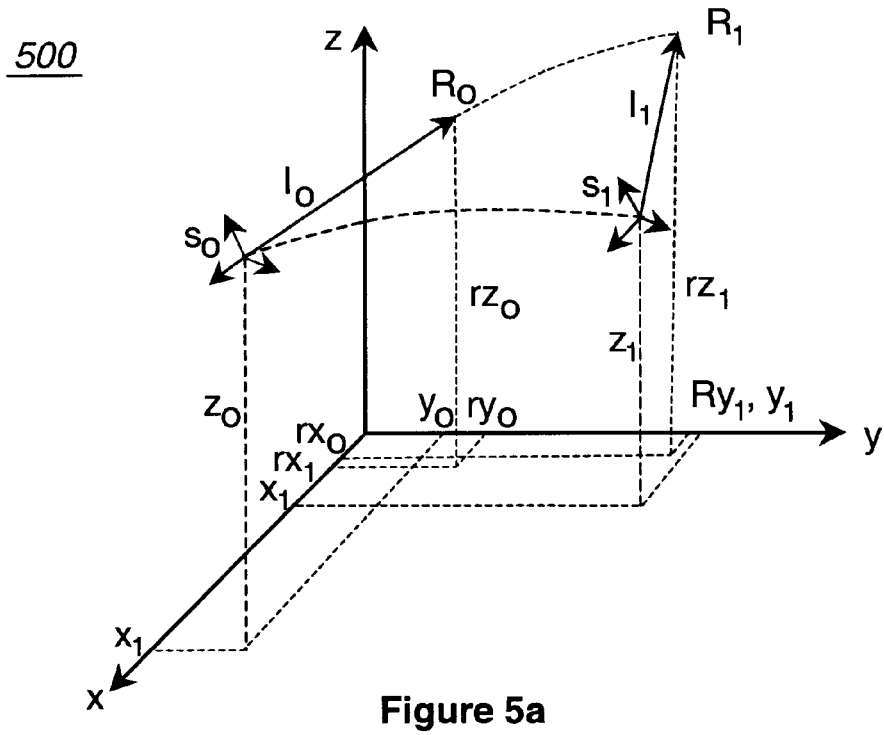
FIGS. 5a and b show three-dimensional space diagrams illustrating an ephemeris determination scenario using one reference spacecraft.

FIGS. 5a illustrates an ephemeris determination scenario 500 where the ephemeris for a single spacecraft $S_o$, $S_1$ is determined using optical payload pointing and ephemeris information for a single reference spacecraft $R_o$, $R_1$ at multiple points in time. At time $t_o$, the spacecraft $S_o$ is at a first unknown position in space ($x_o$, $y_o$, $z_o$), and the reference spacecraft $R_o$ is at a first reference position ($rx_o$, $ry_o$, $rz_o$). The optical payload is pointed to the reference spacecraft $R_o$, and payload pointing angles ($\alpha_{01}$, $\alpha_{02}$) are measured. The ephemeris for the reference spacecraft $R_o$ is obtained. The ephemeris and payload pointing information, combined with attitude information for the spacecraft $S_o$, essentially define a line $l_0$ in three-dimensional space along which the spacecraft $S_o$ is located at time $t_o$.

At a second point in time $t_1$, the spacecraft $S_1$ is at a second unknown position ($x_1$, $y_1$, $z_1$) in space, and the reference spacecraft $R_1$ is at a second reference position ($rx_1$, $ry_1$, $rz_1$). The optical payload is again pointed to the reference spacecraft $R_1$, and payload pointing angles ($\alpha_{11}$, $\alpha_{12}$) are measured. The ephemeris for the reference spacecraft $R_1$ is obtained. The ephemeris and payload pointing information, combined with attitude information for the spacecraft $S_1$, essentially define a line $l_1$ in three-dimensional space along which the spacecraft $S_1$ is located at time $t_1$.

Figure 5B:
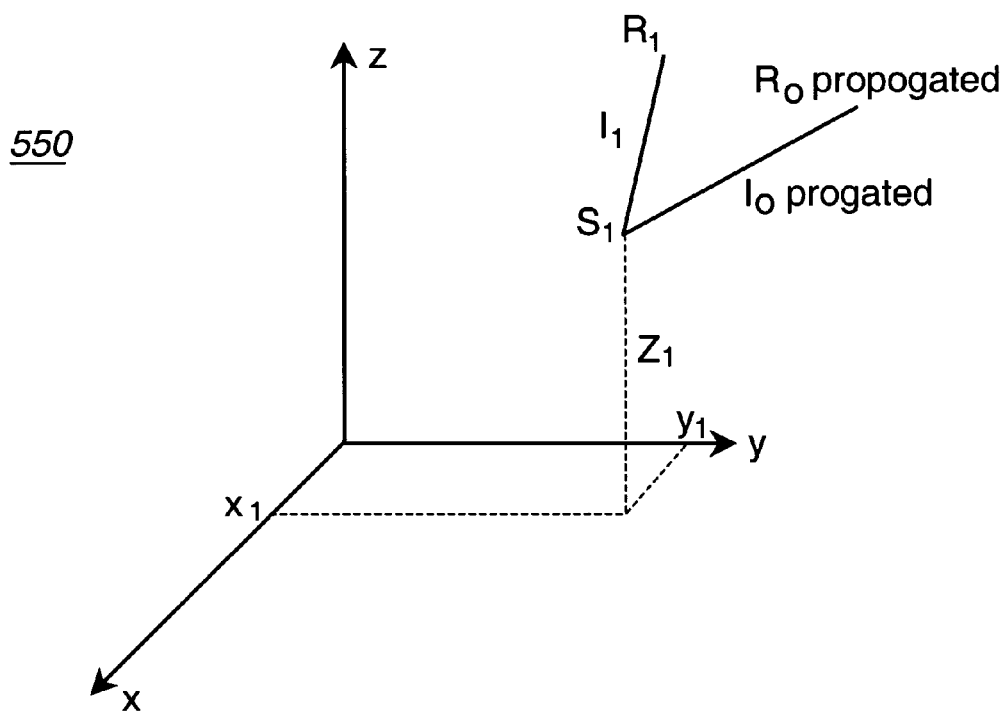

To solve for the position of the spacecraft $S_1$ at time $t_1$, as illustrated 550 in FIG. 5b, relative change in position of the spacecraft $S_1$ may be propagated forward in time t, from $S_0$ resulting in relative colocation of the points $S_0$ and $S_1$ on the line $l_0$ or $l_1$. The intersection of the two lines $l_1$, $l_{o\,propagated}$ will then indicate the position of the spacecraft $S_1$ at time $t_1$. Propagation of the spacecraft position may be accomplished using established mathematical techniques involving equations of state. Continual measurements over a period of time will increase the accuracy of the calculation. Information utilized by the mathematical techniques may include, but is not limited to, information from additional spacecraft sensors, gravitational or orbital modeling, knowledge of the spacecraft orbital plane and period, altitude information and ground-based ranging information.

Figure 6:
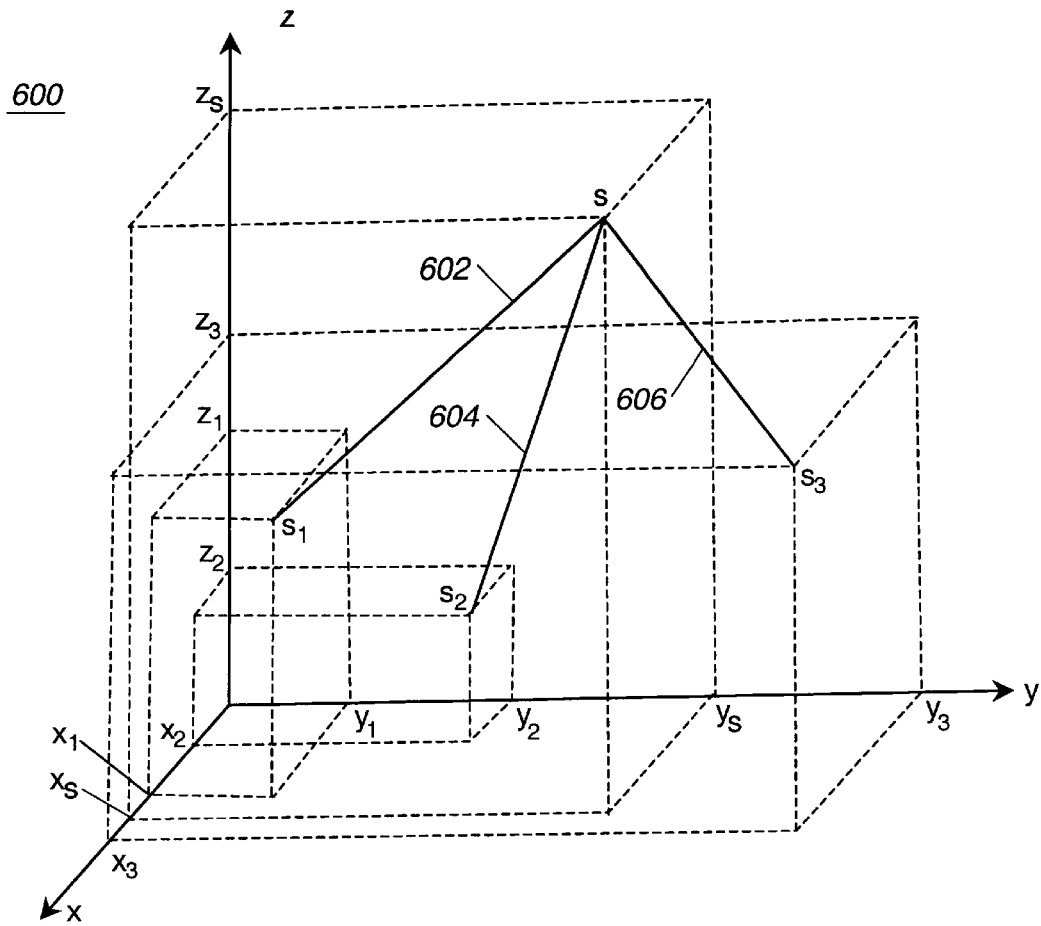
FIG. 6 shows a three-dimensional space diagram illustrating an ephemeris determination scenario using multiple reference spacecraft.

Another, and preferred, option for determining ephemeris for a spacecraft involves optical payload pointing lines to multiple reference spacecraft. FIG. 6 illustrates an ephemeris determination scenario in three-dimensional space 600 involving a spacecraft S with three optical payload pointings (602, 604 and 606) to three reference spacecraft (S1, S2 and S3 respectively). The spacecraft S knows the ephemeris for each of the reference spacecraft (S1, S2 and S3) at a point in time (or at different points in time sufficiently close). The spacecraft also knows the sensor pointing angles for its optical payload sensors. The spacecraft S may then solve for its location using established trigonometric relationships and/or mathematical techniques involving ephemeris propagation conforming to equations of state. Multiple location determinations over time may then be used to determine spacecraft velocity.

The ephemeris determined for the spacecraft may be an absolute ephemeris measured relative to some universal reference, or alternatively the ephemeris may be measured relative to other object(s), for example other satellites in a satellite constellation system. In a system in which the orbital control task is to manage the position of a spacecraft relative to other spacecraft, it may be advantageous to use relative ephemeris referencing.

In the scenario illustrated in FIG. 6, it is not necessary for the spacecraft S to know its own attitude (particularly if the measurements are made substantially simultaneously). However, additional information, such as the spacecraft's attitude, inertial reference unit information, measurements of optical payload sensor angles at different points in time, ranging information, propagated ephemeris and sensed positions of other bodies, such as the Earth, may be used to increase the fidelity of the ephemeris calculation.

Figure 7:
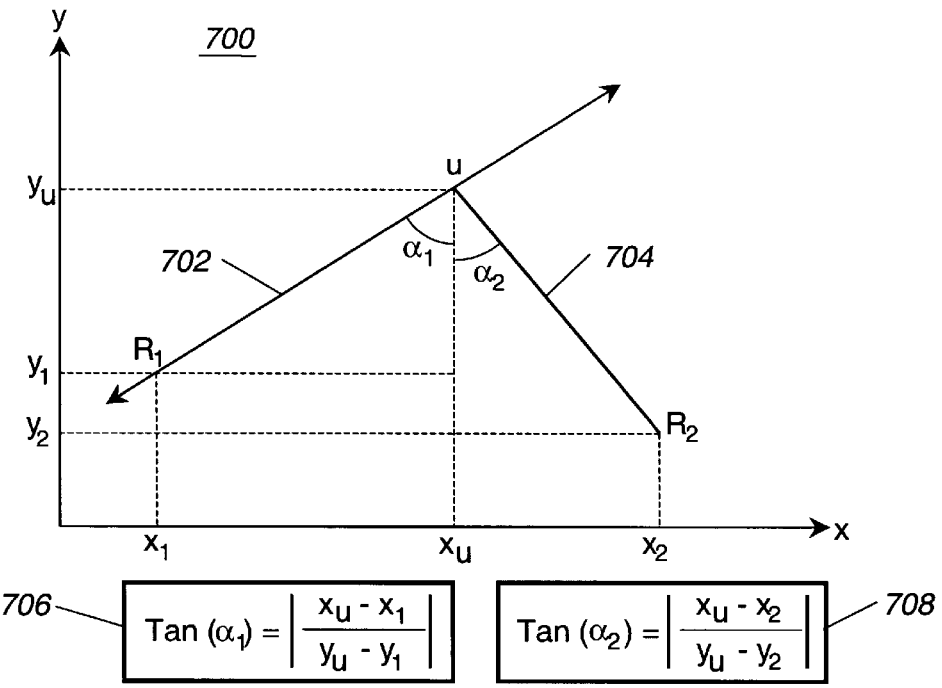
FIG. 7 shows a two-dimensional space diagram illustrating an ephemeris determination scenario.

FIG. 7 shows a two-dimensional space 700 to illustrate the determination of ephemeris. For this example, the spacecraft U attitude has been determined, and thus the angular relationship between the spacecraft's own coordinate system, in which sensor pointing angles are measured, and the spatial coordinate system defined by the X and Y axes can be determined.

Initially, the spacecraft U points its optical payload at a first reference spacecraft R1 along a first line 702. The sensor angle $\alpha 1$ for the line 702 between the spacecraft U and the first reference spacecraft R1 is measured. The spacecraft U also obtains the ephemeris for the first reference spacecraft R1, thus the spacecraft U is able to define the line 702 in two-dimensional space between the spacecraft U and the first reference spacecraft R1. The spacecraft U then points its optical payload at a second reference spacecraft R2 along a line 704. The sensor angle $\alpha 2$ for the line 704 between the spacecraft U and the second reference spacecraft R2 is measured, and the ephemeris of the second reference spacecraft R2 is obtained. The result is the two equations (706 and 708) for two unknowns shown in FIG. 7, which may be readily solved by on-board ephemeris determination software using established trigonometric relationships.

Figure 8:
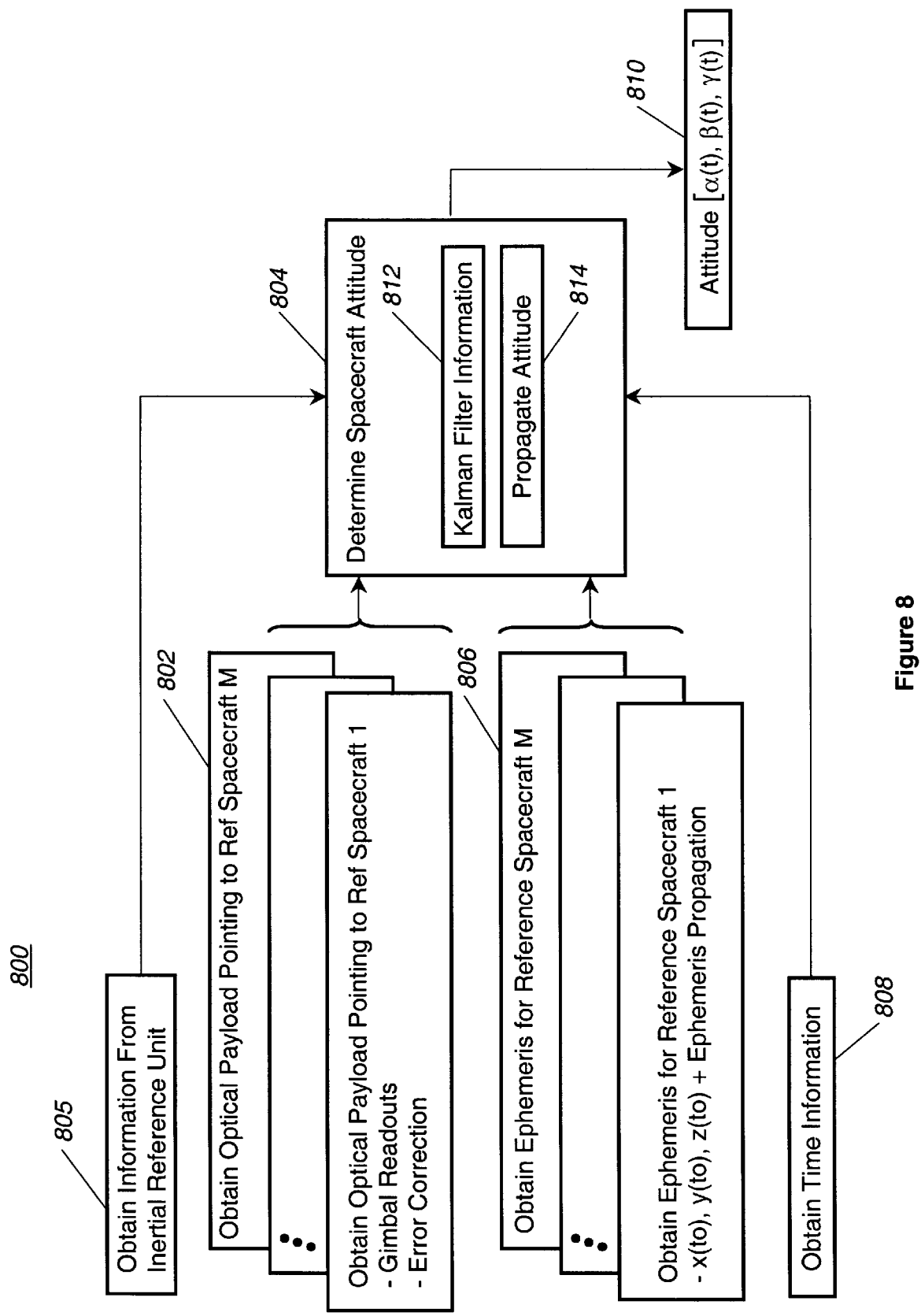
FIG. 8 illustrates attitude determination according to a preferred embodiment of the present invention.

FIG. 8 illustrates an attitude determination process 800 according to a preferred embodiment of the present invention. Pointing angles for optical payload sensors pointing to reference spacecraft are obtained 802 and the information is provided for the attitude determination step 804. This information is obtained substantially simultaneously, or alternatively inertial reference unit information 805 is obtained and used to compensate for time variant attitude reference changes. Ephemeris information for each reference spacecraft is also obtained 806 and provided for the attitude determination step 804. In addition, time information is obtained 808 and provided for the attitude determination step 804. The attitude determination step 804 then determines the attitude for the spacecraft based on the input information obtained and provided in steps 802, 806, 808 and 805 (if necessary).

The attitude determination step 804 preferably includes a Kalman filtering step 812 so that past information and determinations can be used to increase the fidelity of the current attitude determination. In addition, the attitude determination step 804 preferably includes an attitude propagation step 814, including attitude modeling, for the propagation of attitude between external inputs.

The method and apparatus of the present invention utilizes existing spacecraft optical payload capabilities and subsystems to determine ephemeris and attitude for a spacecraft. The present invention provides a low-cost alternative to expensive spacecraft ephemeris determination subsystems (e.g., GPS). The present invention can either serve as a primary ephemeris and/or attitude determination subsystem or as a secondary system. The ephemeris and/or attitude information produced by the present invention may also be used to augment ephemeris and attitude information obtained from other sources, thereby increasing the accuracy of ephemeris and attitude determinations.

While particular elements, embodiments and applications of the present invention have been shown and described, it will be understood that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for determining ephemeris for a space vehicle, the method comprising:

pointing an optical payload sensor to at least one reference spacecraft;

obtaining pointing direction information for said optical payload sensor;

obtaining reference ephemeris information for said reference spacecraft; and determining ephemeris for said space vehicle based on said pointing direction information and said reference ephemeris information.

2. The method of claim 1 further comprising obtaining attitude information for said space vehicle, and wherein said step of determining ephemeris comprises determining ephemeris further based on said attitude information.

3. The method of claim 1 including performing said steps of pointing an optical payload sensor, obtaining pointing direction information, and obtaining reference ephemeris information for a plurality of reference spacecraft.

4. The method of claim 1 further comprising obtaining time information, and wherein said step of determining ephemeris comprises determining ephemeris further based on said time information.

5. The method of claim 4 including performing said steps of pointing an optical payload sensor, obtaining pointing direction information, obtaining reference ephemeris information and obtaining time information for said reference spacecraft at a plurality of points in time.

6. The method of claim 5 wherein said step of determining ephemeris comprises Kalman filtering at least one of the group consisting of said pointing direction information, said reference ephemeris information, and said determined ephemeris.

7. The method of claim 4 further comprising obtaining orbital information from gravitational modeling, and wherein said step of determining ephemeris comprises determining ephemeris further based on said orbital information.

8. The method of claim 1 further comprising establishing crosslinks between said reference spacecraft and said space vehicle, and wherein said step of obtaining reference ephemeris information comprises obtaining reference ephemeris information over said crosslinks.

9. The method of claim 1 further comprising obtaining independent ephemeris information for said space vehicle from an independent ephemeris reference source, and wherein said step of determining ephemeris comprises determining ephemeris further based on said independent ephemeris information.

10. A space vehicle ephemeris determination system comprising:
   a processor;
   a memory coupled to said processor, said memory storing ephemeris determination instructions that determine ephemeris using optical payload pointing data and reference spacecraft ephemeris data;
   an optical payload assembly coupled to said processor for pointing to at least one reference spacecraft and providing said optical payload pointing data to said processor; and
   a receiver coupled to said processor which receives as input ephemeris information for at least one reference spacecraft and outputs said reference spacecraft ephemeris data to said processor.

11. The ephemeris determination system of claim 10 further comprising an attitude reference subsystem coupled to said processor for providing attitude reference data to said processor, and wherein said ephemeris determination instructions determine ephemeris further using said attitude reference data.

12. The ephemeris determination system of claim 10 further comprising an on-board clock coupled to said processor for providing time data to said processor, and wherein said ephemeris determination instructions determine ephemeris further using said time data.

13. The ephemeris determination system of claim 12 wherein said ephemeris determination instructions comprise Kalman filtering instructions.

14. The ephemeris determination system of claim 10 further comprising an independent ephemeris reference subsystem coupled to said processor for providing independent space vehicle ephemeris information for said space vehicle to said processor, and wherein said ephemeris determination instructions determine ephemeris further using said independent space vehicle ephemeris information.

15. A method for determining attitude for a space vehicle, the method comprising:
   pointing an optical payload sensor to at least one reference spacecraft;
   obtaining pointing direction information for said optical payload sensor;
   obtaining reference ephemeris information for said reference spacecraft; and
   determining attitude for said space vehicle based on said pointing direction information and said reference ephemeris information.

16. The method of claim 15 further comprising obtaining ephemeris information for said space vehicle, and wherein said step of determining attitude comprises determining attitude further based on said ephemeris information.

17. The method of claim 15 including performing said steps of pointing an optical payload sensor, obtaining pointing direction information, and obtaining reference ephemeris information for a plurality of reference spacecraft.

18. The method of claim 15 further comprising obtaining time information, and wherein said step of determining attitude comprises determining attitude further based on said time information.

19. The method of claim 18 including performing said steps of pointing an optical payload sensor, obtaining pointing direction information, obtaining reference ephemeris information, and obtaining time information for said reference spacecraft at a plurality of points in time.

20. The method of claim 19 wherein said step of determining attitude comprises Kalman filtering at least one of the group consisting of said pointing direction information, said reference ephemeris information, and said determined attitude.

21. The method of claim 15 further comprising establishing crosslinks between said reference spacecraft and said space vehicle, and wherein said step of obtaining reference ephemeris information comprises obtaining reference ephemeris information over said crosslinks.

22. The method of claim 15 further comprising obtaining independent attitude information for said space vehicle from an independent attitude reference source, and wherein said step of determining attitude comprises determining attitude further based on said independent attitude information.

23. The method of claim 18 further comprising obtaining independent attitude information for said space vehicle from an independent attitude reference source, and wherein said step of determining attitude comprises determining attitude further based on said independent attitude information.

24. A space vehicle attitude determination system comprising:
   a processor;
   a memory coupled to said processor, said memory storing attitude determination instructions that determine ephemeris using optical payload pointing data and reference spacecraft ephemeris data;
   an optical payload assembly coupled to said processor for pointing to at least one reference spacecraft and providing said optical payload pointing data to said processor; and
   a receiver coupled to said processor which receives as input ephemeris information for at least one reference spacecraft and outputs said reference spacecraft ephemeris data to said processor.

25. The attitude determination system of claim 24 further comprising an ephemeris reference subsystem coupled to said processor for providing ephemeris reference data for said space vehicle to said processor, and wherein said attitude determination instructions determine attitude further using said ephemeris reference data.

26. The attitude determination system of claim 24 further comprising an on-board clock coupled to said processor for providing time data to said processor, and wherein said attitude determination instructions determine attitude further using said time data.

27. The attitude determination system of claim 26 wherein said attitude determination instructions comprise Kalman filtering instructions.

28. The attitude determination system of claim 24 further comprising an independent attitude reference subsystem coupled to said processor for providing independent space vehicle attitude information for said space vehicle to said processor, and wherein said attitude determination instructions determine attitude further using said independent space vehicle attitude information.

* * * * *